(12) United States Patent
Kim et al.

(10) Patent No.: US 7,493,135 B2
(45) Date of Patent: *Feb. 17, 2009

(54) TRANSMISSION METHOD FOR DOWNLINK CONTROL SIGNAL IN MIMO SYSTEM

(75) Inventors: Bong-Hoe Kim, Gyeonggi-Do (KR); Dong-Youn Seo, Seoul (KR); Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 605 days.

This patent is subject to a terminal disclaimer.

(21) Appl. No.: 11/097,017

(22) Filed: Mar. 31, 2005

(65) Prior Publication Data

US 2005/0220000 A1    Oct. 6, 2005

Related U.S. Application Data

(60) Provisional application No. 60/559,292, filed on Apr. 2, 2004.

(51) Int. Cl.
*H04B 7/00* (2006.01)

(52) U.S. Cl. .................. 455/522; 455/39; 455/561; 455/500; 370/328; 370/470

(58) Field of Classification Search ............... 455/522, 455/39, 561, 500, 78; 370/328, 470, 331
See application file for complete search history.

(56) References Cited

U.S. PATENT DOCUMENTS

| | | | | |
|---|---|---|---|---|
| 1,566,936 A | * | 12/1925 | Trombetta | 290/4 B |
| 5,603,093 A | * | 2/1997 | Yoshimi et al. | 455/63.1 |
| 6,859,503 B2 | * | 2/2005 | Pautler et al. | 375/299 |
| 7,006,464 B1 | * | 2/2006 | Gopalakrishnan et al. | 370/328 |
| 7,269,436 B2 | * | 9/2007 | Won | 455/522 |
| 2004/0009755 A1 | * | 1/2004 | Yoshida | 455/101 |
| 2005/0009476 A1 | * | 1/2005 | Wu et al. | 455/101 |
| 2005/0128965 A1 | * | 6/2005 | Seo et al. | 370/310 |
| 2005/0220065 A1 | * | 10/2005 | Kim et al. | 370/342 |
| 2006/0133262 A1 | * | 6/2006 | Sutivong et al. | 370/209 |

FOREIGN PATENT DOCUMENTS

EP    1 255 369 A1    11/2002
EP    1 257 075 A1    11/2002

* cited by examiner

*Primary Examiner*—Minh D Dao
(74) *Attorney, Agent, or Firm*—Lee, Hong, Degerman, Kang & Waimey

(57) ABSTRACT

Disclosed is a transmission method for a downlink control signal in a MIMO communication system where multiple transmit antennas and multiple receive antennas are used, in which each data transmitted from the multiple transmit antennas is transmitted with a different control signal through one downlink control signal transmission channel. The transmission method for a downlink control signal in a MIMO communication system efficiently transmits or receives data by transmitting control information such as a different modulation method and the number of OVSF codes of each transmit antenna to a mobile station. Also, a control channel is similar to that used in the conventional HSDPA system, thus allowing backward compatibility. Additionally, the transmission method can be applied not only for data transmitted to each antenna being composed of one packet but also for data transmitted to each antenna being composed of multiple packets.

6 Claims, 2 Drawing Sheets

TRANSMISSION METHOD FOR DOWNLINK CONTROL SIGNAL IN MIMO SYSTEM

CROSS-REFERENCE TO RELATED APPLICATIONS

Pursuant to 35 U.S.C. § 119(a), this application claims the benefit of earlier filing date and right of priority to U.S. Provisional Application No. 60/559,292, filed on Apr. 2, 2004; the contents of which is hereby incorporated by reference herein in its entirety.

BACKGROUND OF THE INVENTION

1. Field of the Invention

The present invention relates to a transmission method for a downlink control signal in a MIMO communication system capable of transmitting/receiving data by transmitting different control information regarding a modulation method and an OVSF code to a mobile station from each transmit antenna.

2. Description of the Related Art

A MIMO communication system has been known to perform an operation to transmit/receive data better than a single antenna system, that is, a single antenna vs. a single antenna or a single antenna vs. multiple antennas. In order for the MIMO communication system to perform an improved operation, multiple signals transmitted to multiple receive antennas must not be relevant to one another under an abundant scattering environment. However, if the signals are not completely relevant to one another, the operation ability of the MIMO system is decreased. Hereinafter, one embodiment of a MIMO communication system in accordance with the related art will be explained.

FIG. 1 is a view showing a construction of a vertical bell laboratories layered space time (V-BLAST) system in a MIMO communication system in accordance with the related art.

Referring to FIG. 1, the construction of the vertical bell laboratories layered space time (V-BLAST) system in a MIMO communication system in accordance with the related art will be explained as follows.

The V-BLAST is a kind of MIMO communication system including multiple transmit/receive antennas, in which M antennas are used at a transmitting end and N antennas are used at a receiving end under a condition of M≦N.

At the transmitting end, different signals are transmitted to each antenna so that data sequentially generated can be respectively transmitted from each transmit antenna to each receive antenna. To this end, each transmission data 11 undergoes a vector encoder 10, that is, undergoes a serial-to parallel circuit so as to transmit data sequentially generated to each antenna in parallel. A modulation method of data transmitted to each antenna and the number of channel codes can be differently set. The channel code denotes a code having an orthogonal characteristic like an OVSF code.

In case of using multiple transmit antennas 12, different signals are transmitted to different antennas under a state that an additional signal process is not performed or a space-time code is not used. That is, an additional signal process for enhancing quality to transmit data is not performed at a transmitting end.

That is, different signals are transmitted from each antenna at a transmitting end, and the transmitted signals are received by each receive antenna by using an additional algorithm at a receiving end. The receiving end properly detects the signals transmitted from each antenna. A V-BLAST signal processor 18 of a receiving end shown in FIG. 1 shows a signal processing unit for detecting signals respectively transmitted from M antennas at a receiving end.

An operation of the V-BLAST system will be explained in more detail as follows. The transmitting end of the V-BLAST system transmits different signals with regard to inputted data from each transmit antenna without performing an additional signal process or using a space-time code.

A modulation of each antenna and the number of channel codes such as an OVSF code can be differently set.

That is, if a channel state of a downlink transmitted from a transmitting end antenna is good, data of QAM modulation method and a high coding rate is transmitted by using many OVSF codes. On the other hand, if the channel state is not good, data of QPSK modulation method and a low coding rate is transmitted by using less OVSF codes.

The transmitting end processes each different signal to be transmitted from each different antenna by differently setting each modulation method or the number of OVSF codes, and the receiving end detects each signal differently transmitted from each transmit antenna through a proper signal processing.

The signal processing at the receiving end is performed by calculating a weight vector of a receiving array antenna of a receiving end with regard to each signal transmitted from each transmit antenna by considering a signal transmitted from another transmit antenna as an interference signal at the time of detecting a signal transmitted from a specific transmit antenna, and is performed by removing an influence of a previously detected signal on the receiving end. The signal processing at the receiving end is also performed by detecting signals transmitted from each transmit antenna in the order that a ratio of a signal to interference noise is greater.

As aforementioned, in case that each transmit antenna has a different modulation, coding rate, and the number of OVSFs, the information has to be transmitted to a mobile station through a downlink.

In the conventional high speed downlink packet access (HSDPA) system, the information is transmitted to a mobile station through a HSDPA-shared control channel (HS-SCCH). However, in the HSDPA system, multiple transmit/receive antennas are not constructed differently from the MIMO system, thus transmitting only information for one antenna through the HS-SCCH. On the contrary, in the MIMO system, multiple transmit antennas can have different modulations, coding rates, the number of OVSFs, etc. thereby to require a control signal for each antenna.

SUMMARY OF THE INVENTION

Therefore, an object of the present invention is to provide a transmission method for a downlink control signal in a MIMO communication system where multiple transmit antennas and multiple receive antennas are used, in which each data transmitted from the multiple transmit antennas is transmitted with a different control signal through one downlink control signal transmission channel.

The control signal is information regarding a different modulation method or the number of channel codes of each transmit antenna, and the channel code is a code having an orthogonal characteristic such as an OVSF code.

The downlink control signal transmit channel is divided into sectors, the total number of sectors equaling the total number of the transmit antennas, and control information of each transmit antenna is allocated to each sector thereby to be transmitted.

Each sector of the downlink control signal transmit channel is composed of a field to which bits for a modulation method of each transmit antenna is allocated and a field to which bits for a channel code is allocated.

In case that the number of the modulation methods is X, the number of bits corresponding to a minimum value among integers greater than or equal to a value of $\log_2 X$ is allocated as a control signal. Bits denoting a starting point and an ending point of a channel code tree to which a channel code is allocated are allocated as a bit for the channel code.

In case that data is not transmitted through a specific transmit antenna, an arbitrary value set at a transmitting end and a receiving end is allocated as the bits regarding the channel code of the specific transmit antenna.

According to another embodiment of the present invention, there is provided a transmission method for a downlink control signal in a MIMO communication system where multiple transmit antennas and multiple receive antennas are used, in which each data transmitted from the multiple transmit antennas is transmitted with a different control signal through downlink control signal transmission channels corresponding to the number of the multiple transmit antennas.

The control signal is information regarding a different modulation method or the number of channel codes of each transmit antenna, and the channel code is a code having an orthogonal characteristic such as an OVSF code.

The downlink control signal transmit channels are provided with control information of each transmit antenna.

Each downlink control signal transmit channel is composed of a field to which bits for a modulation method of each transmit antenna is allocated and a field to which bits for a channel code is allocated.

In case that the number of the modulation methods is X, the number of bits corresponding to a minimum value among integers greater than or equal to a value of $\log_2 X$ is allocated as a control signal. Bits denoting a starting point and an ending point of a channel code tree to which a channel code is allocated are allocated as the bits for the channel code.

In case that data is not transmitted through a specific transmit antenna, an arbitrary value set at a transmitting end and a receiving end is allocated as the bits for the channel code of the specific transmit antenna.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is to provide a transmission method for a signal in a MIMO communication system that plural antennas are used at a transmitting end and a receiving end.

Before explaining the present invention, a high speed downlink packet access (HSDPA) system and a channel structure of the system in accordance with the related art will be explained. The HSDPA system denotes a data transmission method including an HSDPA-downlink shared channel (HS-DSCH), that is, a downlink data channel for supporting a high speed downlink packet data in a universal mobile telecommunications system (UMTS) communication system and a control channel relevant to the HS-DSCH, that is, an HSDPA-shared control channel (HS-SCCH).

The HSDPA system not only fast provides packet data service, but also fast provides voice service provided by being changed into an internet protocol packet. To this end, many functions such as an adaptive modulation and coding (AMC), a hybrid automatic retransmission request (HARQ), etc. are required. The AMC is a method for changing a modulation and a coding rate of a signal to be transmitted according to a quality and a channel condition of a signal received at a mobile station. That is, the AMC is a method for allocating higher modulation and coding rate to a mobile station close to a base station and for allocating lower modulation and coding rate to a mobile station far from a base station. The method is to change a modulation method and a coding method of data at a transmitting end according to an amount of data and wireless environment. A modulation method of 4, 16 QAM is being currently used.

The HARQ method includes a chase combining method and an incremental redundancy method, which adds a forward error correction (FEC) function to an ARQ function for re-trasnsmitting received data in case that the received data has an error. An ARQ method used in the HSDPA system is an IR method.

The HSDPA system applies not only an HS-DSCH but also control channels. The control channels have to include a channel for transmitting a control message of the HSDPA system, that is, an HS-SCCH.

Figure 2:
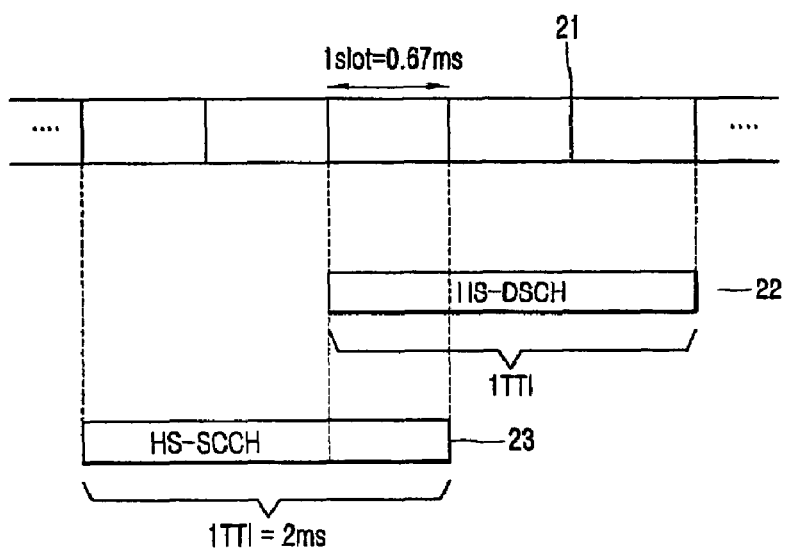
FIG. 2 is a view schematically showing a channel structure of a general HSDPA system.

FIG. 2 is a view schematically showing a channel structure of a general HSDPA system.

Referring to FIG. 2, the reference numeral 21 denotes one time slot in a time slot format of a downlink shared channel (DSCH).

A channel structure of a general HSDPA system is composed of an HSDPA downlink shared channel (HS0DSCH) 22 and a control channel relevant to the HS-DSCH 22, that is, an HSDPA shared control channel (HS-SCCH) 23. The HS-DSCH 22 and the HS-SCCH 23 are not transmitted in a state that each slot boundary is consistent to each other, but are transmitted in a state that one slot of the HS-DSCH 22 is overlapped with one slot of the HS-SCCH 23. Accordingly, one slot of the HS-SCCH 23 positioned at the back side among three slots and one slot of the HS-DSCH 22 positioned at the front side among three slots are overlapped with each other, so that the HS-SCCH 23 is always transmitted prior to the HS-DSCH 22.

As the HS-DSCH 22, a DSCH being used in an asynchronous code division multiple access system can be used as it is or can be used by being modified. The HS-DSCH 22 is a channel for transmitting the HSDPA service data. Whereas the HS-DSCH 22 is a channel for transmitting only data, the HS-SCCH 23 is a channel for transmitting control information for the HS-DSCH 22.

In the HSDPA system, information of a modulation and a coding rate determined by the AMC method is transmitted through the HS-SCCH 23.

However, in the HSDPA system, multiple transmit/receive antennas are not constructed differently from the MIMO system, thus transmitting only information for one antenna through the HS-SCCH 23.

On the contrary, the present invention relates to a MIMO communication system that multiple antennas are used at a transmitting end and a receiving end, in which control information such as a modulation, a coding rate, etc. respectively applied to data transmitted from multiple transmit antennas is transmitted to one channel or multiple channels. To this end, the control information is transmitted through the HS-SCCH for transmitting a downlink control signal of the HSDPA system.

Hereinafter, preferred embodiments of the present invention will be explained in more detail with reference to the attached drawings.

In the present invention, it is assumed that M transmit antennas and N receive antennas are provided in the MIMO communication system ($M \leq N$).

Also, in the MIMO communication system of the present invention, packets transmitted from each antenna are respectively transmitted in a state that a cyclic redundancy check is attached thereto at the time of transmitting data from a transmitting end, or one packet having a cyclic redundancy check can be transmitted to multiple antennas. The cyclic redundancy check is for using a circular binary code in order to detect errors generated at the time of transmitting data.

Figure 1:
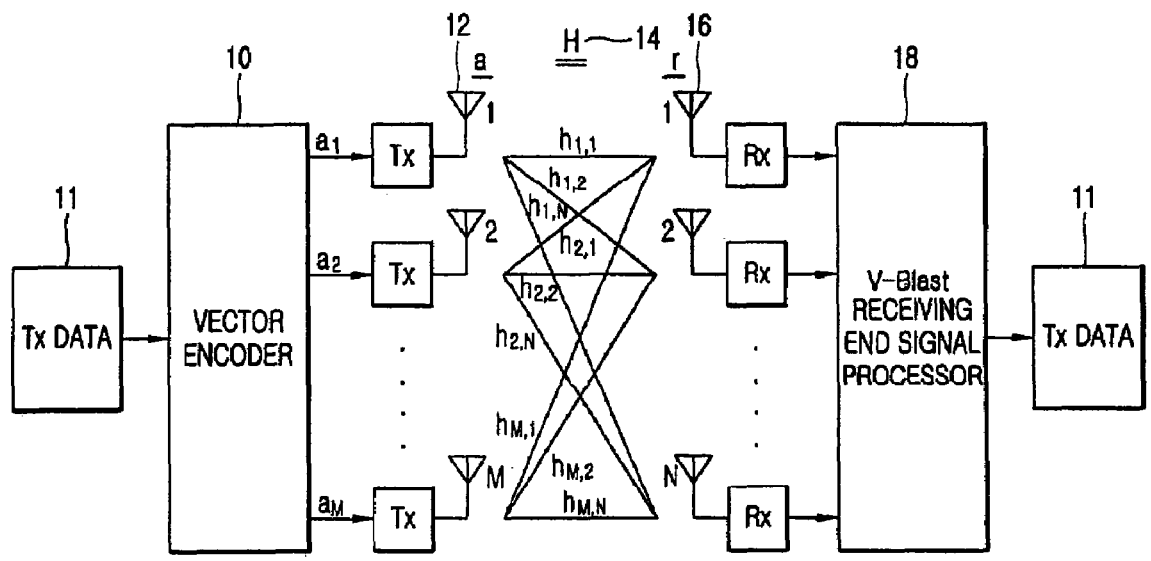
FIG. 1 is a view showing a construction of a vertical bell laboratories layered space time (V-BLAST) system in a MIMO communication system in accordance with the related art.

The MIMO system according to the present invention has the same construction as that of the MIMO system shown in FIG. 1, and is different from the conventional MIMO system in that different control signals such as a modulation method, a coding rate, the number of OVSF codes, etc. are transmitted from multiple transmit antennas through a specific control channel.

Figure 3:
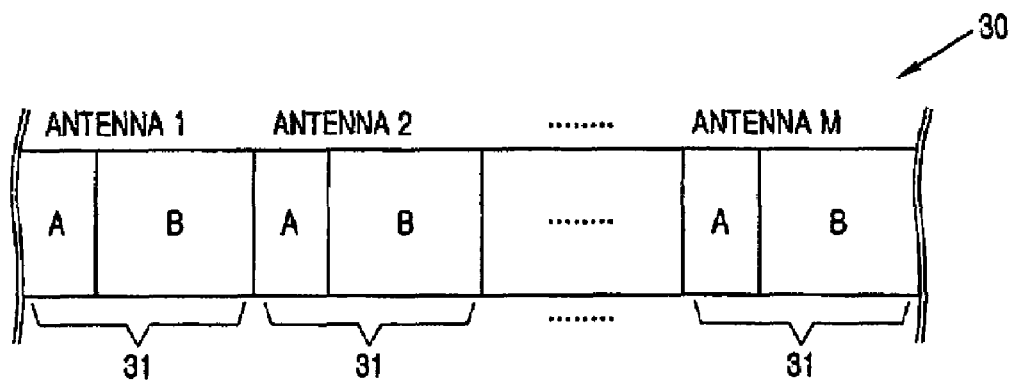
FIG. 3 is a view showing a transmission channel for a downlink control signal in a MIMO system according to one embodiment of the present invention.

FIG. 3 is a view showing a transmission channel for a downlink control signal in a MIMO system according to one embodiment of the present invention.

When M transmit antennas and N receive antennas are used to transmit data in the MIMO communication system, data to be transmitted, that is, data sequentially generated undergoes a vector encoder at the transmitting end so as to respectively transmit the data from each transmit antenna, and then the data is divided into M data thereby to be transmitted through each antenna.

A modulation and the number of channel codes of data transmitted to each antenna can be differently set, respectively. The channel code denotes a code having an orthogonal characteristic such as an OVSF code.

The modulation method and the number of OVSF codes of each transmit antenna are determined by a scheduler of a base station. Since each transmit antenna has a different modulation method and the number of OVSF codes, control information such as the modulation method and the number of OVSF codes need to be transmitted to a mobile station.

In the preferred embodiment of the present invention, M control information is transmitted through a downlink control signal transmission channel 30 by a similar way to use the HS-SCCH for transmitting a downlink control signal in the HSDPA system. At this time, one downlink control signal transmission channel 30 is formed.

More specifically, a modulation method and the number of OVSF codes determined at each transmit antenna is transmitted through one downlink control signal transmission channel 30, in which the downlink control signal transmission channel 30 is divided into sectors 31, the total number of sectors equaling the total number of the transmit antennas, and control information such as a modulation method and the number of OVSF codes of each transmit antenna is allocated to each sector 31 thereby to transmit the control information of each antenna to a mobile station.

For example, in case that a modulation method is divided into only QPSK or 16 QAM, one bit is allocated as a control signal. Since maximum 15 OVSF codes can be allocated as the control signal when a spreading factor of the OVSF code is 16, bits are allocated to represent a starting point and an ending point of an OVSF code tree to which an OVSF code is allocated and thereby to be transmitted. Accordingly, the control information of each transmission antenna can be transmitted to a mobile station.

That is, each sector of the downlink control signal transmission channel 30 is composed of a filed A to which bits for a modulation method are allocated, and a field B to which bits for an OVSF code are allocated.

In case that the number of the modulation methods is X, the number of bits corresponding to a minimum value among integers greater or equal than/to a value of $\log_2 X$ is allocated as a control signal.

In the MIMO communication system, since each transmit antenna has a different modulation method and the number of OVSF codes, data may not be transmitted to an antenna according to a channel state.

Accordingly, it is necessary to notify to a mobile station to which antenna data is being transmitted through a downlink control signal transmission channel. To this end, in the present invention, additional bits are not allocated, but bits such as '00 . . . 00' preset at a transmitting end or a receiving end are transmitted to the field B for transmitting information regarding an OVSF code. Accordingly, necessary information can be transmitted without increasing an amount of control information to be transmitted through the downlink control signal transmission channel.

Figure 4:
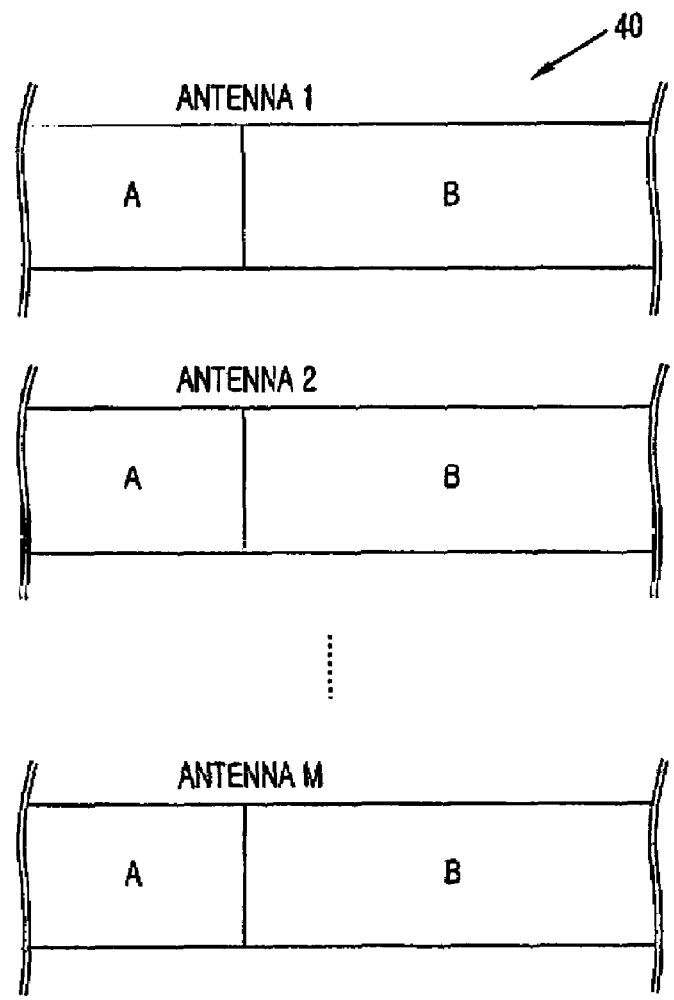
FIG. 4 is a view showing a transmission channel for a downlink control signal in a MIMO system according to another embodiment of the present invention.

FIG. 4 is a view showing a transmission channel for a downlink control signal in a MIMO system according to another embodiment of the present invention.

FIG. 4 is similar to FIG. 3 in that control information is transmitted from each transmit antenna through a downlink control signal transmission channel. However, FIG. 4 is different from FIG. 3 in that multiple downlink control signal transmission channels are formed.

The number of downlink control signal transmission channels 40 is equal to the number of the transmit antennas, and control information such as a different modulation method and the number of OVSF codes is transmitted from each transmission antenna through the downlink control signal transmission channels 40.

More specifically, a modulation method and the number of OVSF codes determined at each transmit antenna is transmitted through the downlink control signal transmission channels 40 having the total number equaling the total number of the transmit antennas, in which control information such as a modulation method and the number of OVSF codes of each transmit antenna is transmitted through each downlink control signal transmission channel 40 thereby to transmit the control information of each antenna to a mobile station.

In case that a modulation method of data is divided into only QPSK or 16 QAM, one bit is allocated as a control signal. Since maximum 15 OVSF codes can be allocated as the control signal when a spreading factor of the OVSF code is 16, bits are allocated to represent a starting point and an ending point of an OVSF code tree to which an OVSF code is allocated thereby to be transmitted.

That is, each downlink control signal transmission channel 40 is composed of a filed A to which bits for a modulation method are allocated, and a field B to which bits for an OVSF code are allocated. In case that the number of the modulation methods is X, the number of bits corresponding to a minimum value among integers greater than or equal to a value of $\log_2 X$ is allocated as a control signal.

In the MIMO communication system, since each transmit antenna has a different modulation method and the number of OVSF codes, data may not be transmitted to an antenna according to a channel state.

Accordingly, it is necessary to notify to a mobile station to which antenna data is being transmitted through the downlink control signal transmission channels 40. To this end, in the present invention, additional bits are not allocated, but bits such as '00 . . . 00' preset at a transmitting end or a receiving end are transmitted to the field B for transmitting information regarding an OVSF code. Accordingly, necessary information can be transmitted without increasing an amount of control information to be transmitted through the downlink control signal transmission channels.

As aforementioned, the present invention can be applied not only for data transmitted from each antenna under a state that a cyclic redundancy check is attached to each data but also for one data having a cyclic redundancy check transmitted to multiple antennas.

As described earlier, the present invention is to provide a transmission method for a downlink control signal in a MIMO communication system capable of efficiently transmitting or receiving data by transmitting control information such as a different modulation method and the number of channel codes of each transmit antenna to a mobile station.

Also, a control channel is similar to that used in the conventional HSDPA system, thus allowing a backward compatibility. Additionally, the present invention can be applied not only for data transmitted to each antenna being composed of one packet but also for data transmitted to each antenna being composed of multiple packets.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A transmission method for a downlink control signal in a MIMO communication system where multiple transmit antennas and multiple receive antennas are used, the method comprising:

transmitting from each of the multiple transmit antennas with a different control signal through one downlink control signal transmit channel, wherein the control signal comprises information regarding a modulation method or the number of channel codes of each transmit antenna, the channel codes having an orthogonal characteristic, wherein the downlink control signal transmit channel is divided into sectors, each sector comprising a field to which bits for a modulation method of each transmit antenna are allocated and a field to which bits for a channel code are allocated, wherein if the number of the modulation methods is X, the number of bits corresponding to a minimum value among integers greater than or equal to a value of $\log_2 X$ is allocated as the control signal, and bits denoting a starting point and an ending point of a channel code tree to which a channel code is allocated are allocated as the bits for the channel code.

2. The method of claim 1, wherein the total number of sectors of the downlink control signal transmit channel eguals the total number of the transmit antennas, and control information of each transmit antenna is allocated to each sector for transmission.

3. A transmission method for a downlink control signal in a MIMO communication system where multiple transmit antennas and multiple receive antennas are used, the method comprising:

transmitting data from the each of the multiple transmit antennas with a different control signal through one downlink control signal transmit channel, wherein the control signal comprises information regarding a modulation method or the number of channel codes of each transmit antenna, the channel codes having an orthogonal characteristic, wherein the downlink control signal transmit channel is divided into sectors, each sector comprising a field to which bits for a modulation method of each transmit antenna are allocated and a field to which bits for a channel code are allocated, wherein if data is not transmitted through a specific transmit antenna, an arbitrary value set at a transmitting end and a receiving end is allocated as the bits for the channel code of the specific transmit antenna.

4. A transmission method for a downlink control signal in a MIMO communication system where multiple transmit antennas and multiple receive antennas are used, the method comprising:

transmitting data from each of the multiple transmit antennas with a different control signal through downlink control signal transmission channels corresponding to the number of the multiple transmit antennas, wherein the control signal comprises information regarding a modulation method or the number of channel codes of each transmit antenna, the channel codes having an orthogonal characteristic, wherein each downlink control signal transmit channel comprises a field to which bits for a modulation method of each transmit antenna are allocated and a field to which bits for a channel code are allocated, wherein if the number of the modulation methods is X, the number of bits corresponding to a minimum value among integers greater than or egual to a value of $\log 2X$ is allocated as a control signal, and bits denoting a starting point and an ending point of a channel code tree to which a channel code is allocated are allocated as the bits for the channel code.

5. The method of claim 4, wherein the downlink control signal transmit channels are provided with control information of each transmit antenna.

6. A transmission method for a downlink control signal in a MIMO communication system where multiple transmit antennas and multiple receive antennas are used, the method comprising:

transmitting data from each of the multiple transmit antennas with a different control signal through downlink control signal transmission channels corresponding to the number of the multiple transmit antennas, wherein the control signal comprises information regarding a modulation method or the number of channel codes of each transmit antenna, the channel codes having an orthogonal characteristic, wherein each downlink control signal transmit channel comprises a field to which bits for a modulation method of each transmit antenna are allocated and a field to which bits for a channel code are allocated, wherein if data is not transmitted through a specific transmit antenna, an arbitrary value set at a transmitting end and a receiving end is allocated as the bits for the channel code of the specific transmit antenna.

\* \* \* \* \*